United States Patent [19]
Burkhart

[11] Patent Number: 5,559,418
[45] Date of Patent: Sep. 24, 1996

[54] STARTING DEVICE FOR SINGLE PHASE INDUCTION MOTOR HAVING A START CAPACITOR

[75] Inventor: Richard M. Burkhart, St. Louis, Mo.

[73] Assignee: Emerson Electric Co., St. Louis, Mo.

[21] Appl. No.: 433,171

[22] Filed: May 3, 1995

[51] Int. Cl.⁶ ......................................................... H02P 1/44
[52] U.S. Cl. .......................... 318/785; 318/781; 318/794; 318/799; 318/805
[58] Field of Search ..................................... 318/767, 778, 318/781, 785, 786, 789, 790, 794, 795, 798, 799, 805

[56] References Cited

U.S. PATENT DOCUMENTS

| | | | |
|---|---|---|---|
| 4,651,077 | 3/1987 | Woyski | 318/781 |
| 4,782,278 | 11/1988 | Bossi et al. | 318/786 |
| 4,806,838 | 2/1989 | Weber | 318/729 |
| 4,843,295 | 6/1989 | Thompson et al. | 318/786 |
| 4,862,053 | 8/1989 | Jordan et al. | 318/786 |
| 5,296,795 | 3/1994 | Dropps et al. | 318/778 |

*Primary Examiner*—Bentsu Ro
*Attorney, Agent, or Firm*—Paul A. Becker, Sr.

[57] ABSTRACT

A starting device for single phase induction motors having a start capacitor is effective to disconnect the start capacitor at a desired motor speed in response to a specific phase relationship between the voltage across the main winding and the voltage across the start winding. The specific phase relationship is a condition wherein a phase angle defined by the phase relationship reverses from a decreasing value to an increasing value.

8 Claims, 3 Drawing Sheets

5,559,418

STARTING DEVICE FOR SINGLE PHASE INDUCTION MOTOR HAVING A START CAPACITOR

BACKGROUND OF THE INVENTION

In single phase induction motors for applications requiring relatively high starting torques, it is quite common to utilize a start capacitor. In such motors, the start capacitor is initially connected to the start or auxiliary winding of the motor to enable a high starting torque to be developed. It is desirable that the start capacitor be disconnected as soon as the motor has started properly and before the high current through the start winding and the stress on the start capacitor can damage the winding and capacitor. It is empirically known that these conditions at which disconnection is desired exist when the motor speed has increased to approximately 80 percent of synchronous speed.

The prior art discloses various electromechanical devices, such as centrifugal switches and relays, for effecting disconnection of the start capacitor. Centrifugal switches have the advantage of being directly responsive to the motor speed. However, because a centrifugal switch is integral with the motor, such a switch is unacceptable in certain applications. For example, such a switch is unacceptable in a hermetically sealed refrigeration compressor apparatus since such a switch could contaminate the refrigerant.

The relays used in the prior art typically are mounted remote from the motor or mounted in a suitable enclosure so as to enable them to be used in conjunction with hermetically sealed apparatus. However, unlike centrifugal switches, relays are not directly responsive to the motor speed. In a typical relay circuit arrangement, the relay coil is connected in parallel with the start winding, and the normally-closed relay contacts and start capacitor are connected in series with each other and in series with the parallel-connected start winding and relay coil. The relay coil is energized to effect opening of its contacts when the voltage across it, which is also the voltage across the start winding, reaches a predetermined pull-in value. It is desired that the predetermined pull-in value occur at the same approximately 80 percent of synchronous speed previously described. Typically, the predetermined pull-in value can be obtained by selecting the proper relay. However, because of variations, such as fluctuations in line voltage, the value of the voltage across the start winding at a specific motor speed will vary. Thus, when the value of the voltage across the start winding is the parameter chosen for effecting relay operation, the motor speed at which the start capacitor is disconnected can vary considerably.

The prior art also discloses totally enclosed electronic starting devices comprising solid state switches, such as triacs, for effecting disconnection of the start capacitor. An advantage of such devices is that, because they are totally enclosed, they can be used in environments such as in hermetically sealed apparatus. Such devices also operate in response to measurement of the value of voltage across the start winding to effect disconnection of the start capacitor at the same approximately 80 percent of synchronous speed previously described. In a typical circuit arrangement utilizing triacs, the triac is in series with the start capacitor and the start winding. The conduction of the triac is controlled by gating circuit means which includes means for compensating for fluctuations in line voltage and corresponding fluctuations in start winding voltage so that the motor speed at which the start capacitor is disconnected remains essentially the same even when line voltage fluctuates. A disadvantage of such triac circuits is that the main terminals of the triac are in series with the start capacitor and the start winding and thus must make, break and carry the relatively large start winding current. Such a large current requirement dictates using relatively expensive triacs.

SUMMARY OF THE INVENTION

A primary object of this invention is to provide a generally new and improved starting device for a single phase induction motor having a start capacitor, which device is effective to disconnect the start capacitor at a desired motor speed by being responsive to a specific condition of the phase angle relationship of the voltage across the main winding and the voltage across the start winding.

In accordance with a preferred embodiment of the present invention, a starting device includes a relay having a coil and a set of normally-closed contacts. The relay contacts connect the start winding and the start capacitor of an induction motor in series across an alternating current power source. The relay coil is connected in series with a triac across the power source. The device includes means, including a microcomputer and related to circuitry, for monitoring the voltages across the main and start windings; for determining the phase relationship between such voltages as the motor speed changes; and for energizing the relay coil so as to open the relay contacts and disconnect the start capacitor when the phase relationship reverses or changes from a decreasing value to an increasing value of phase angle. The motor speed at which such reversal occurs is approximately 80 percent of synchronous speed, which is a desired speed at which the start capacitor should be disconnected to prevent damage to the start winding and start capacitor and is a speed which ensures that the motor has started properly and will continue to operate properly. Preferably, the device also provides means, also responsive to a reversal from a decreasing value to an increasing value of phase angle, for reconnecting the start capacitor in the event the motor begins to stall.

The above mentioned and other objects and features of the present invention will become apparent from the following description when read in conjunction with the accompanying drawings.

DESCRIPTION OF THE PREFERRED EMBODIMENT

Figure 1:
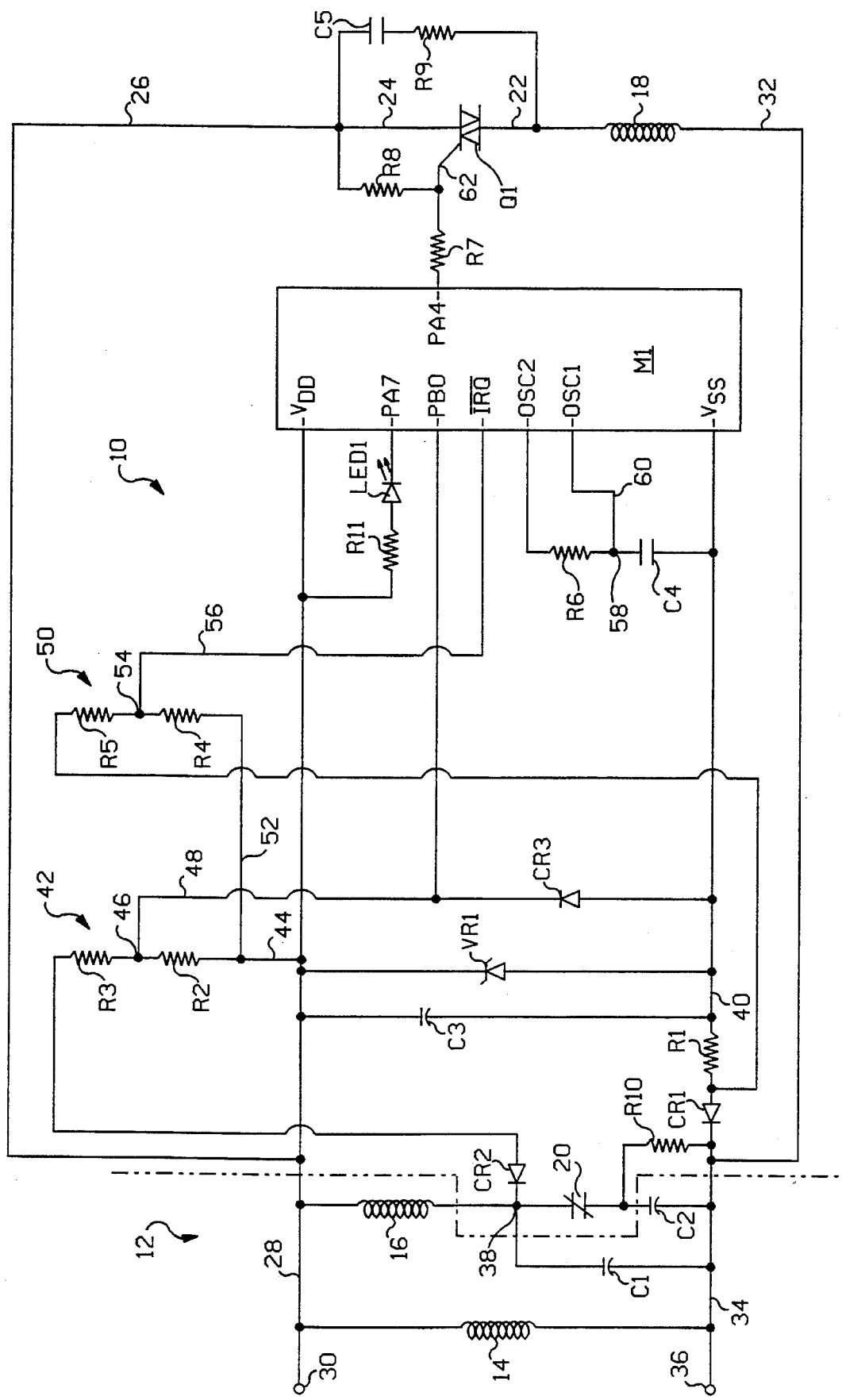
FIG. 1 is a schematic illustration of a motor starting device constructed in accordance with the present invention and shown connected to a capacitor-start, capacitor-run motor.

Referring to FIG. 1, shown generally at 10 is the motor starting device of the present invention. Starting device 10 is shown connected to a capacitor-start, capacitor-run motor indicated generally at 12. Motor 12 includes a main or run winding 14, a start or auxiliary winding 16, a run capacitor C1 and a start capacitor C2.

Starting device 10 includes a relay comprising a coil 18 and a set of normally-closed contacts 20. One side of coil 18 is connected through the main terminals 22 and 24 of a triac Q1, a lead 26 and a lead 28 to one side of a conventional 240 volt alternating current power source at a terminal 30. The other side of relay coil 18 is connected through a lead 32 and a lead 34 to the other side of the power source at a terminal 36. The relay contacts 20 are connected in series with start winding 16 and start capacitor C2 between leads 28 and 34. Run capacitor C1 is connected between lead 34 and a junction 38 between relay contacts 20 and start winding 16, and main winding 14 is connected between leads 28 and 34.

Starting device 10 includes a microcomputer M1 which, in the preferred embodiment, is a Motorola MC68HC705KO. For brevity, only those ports and bits therein necessary to disclose the present invention are shown. Also for brevity, the various ports and bits therein are hereinafter referred to as pins. For example, port PA, bit 7, will be referred to as pin PA7.

A filter capacitor C3 is connected at one end through lead 28 to terminal 30, and at its other end through a lead 40, a series pass resistor R1, a controlled rectifier CR1 and lead 34 to terminal 36. A voltage regulator VR1 is connected in parallel with capacitor C3. Lead 28 is also connected to pin $V_{DD}$ of microcomputer M1, and lead 40 is also connected to pin $V_{SS}$. Capacitor C3, regulator VR1 and resistor R1 function to provide a 5 volt unidirectional power source between pins $V_{DD}$ and $V_{SS}$.

A circuit for monitoring start winding voltage is indicated generally at 42. Circuit 42 comprises a pair of resistors R2 and R3 connected in series between lead 28 and junction 38 through a lead 44 and a controlled rectifier CR2. A junction 46 between resistors R2 and R3 is connected by a lead 48 to pin PB0, and by lead 48 and a controlled rectifier CR3 to lead 40.

A circuit for monitoring main winding voltage is indicated generally at 50. Circuit 50 comprises a pair of resistors R4 and R5 connected in series between lead 28 and lead 34 through lead 44, a lead 52 and controlled rectifier CR1. A junction 54 between resistors R4 and R5 is connected by a lead 56 to pin $\overline{IRQ}$.

An oscillator circuit comprises a resistor R6 and a capacitor C4 connected in series between pin OSC2 and lead $V_{SS}$. The junction 58 between resistor R6 and capacitor C4 is connected by a lead 60 to pin OSC1. The oscillator circuit provides a clock frequency of 2 megahertz. With such clock frequency, the timing resolution is 4 microseconds.

A gate terminal 62 of triac Q1 is connected through a resistor R7 to pin PA4. A resistor R8 is connected between main terminal 24 and gate 62 to prevent unwanted triggering of triac Q1. A snubber network comprising a resistor R9 and a capacitor C5 is connected across main terminals 22 and 24 of triac Q1.

A resistor R10 is connected across start capacitor C2. Resistor R10 provides a discharge path for capacitor C2.

A resistor R11 and an LED1 (light emitting diode) are connected in series between lead 28 and pin PA7. LED1 is energized in the event of a failure of specific hardware or software that is being monitored.

In operation, when electrical power is initially applied to terminals 30 and 36, the 5 volt power source established by capacitor C3, regulator VR1 and resistor R1 is applied to pins $V_{DD}$ and $V_{SS}$, causing microcomputer M1 to be initialized. Concurrently, main winding 14 is energized. Pin PA4 is held at a logic high so that triac Q1 is off. With triac Q1 off, relay coil 18 is de-energized so that its normally-closed contacts 20 remain closed. With relay contacts 20 closed, start winding 16 is energized through contacts 20 and start capacitor C2. Run capacitor C1 is also energized. Under these conditions, the motor develops a starting torque which, if greater than the load requirements, causes the motor to start rotating.

When power source terminal 30 is positive and increasing in value, the voltage at junction 54 between resistors R4 and R5 is also positive and increasing in value due to current flow through resistors R4 and R5. When terminal 30 is negative, rectifier CR1 blocks current flow through resistors R4 and R5 so that the voltage at junction 54 is essentially zero. The voltage at junction 54 is applied through lead 56 to pin $\overline{IRQ}$ of microcomputer M1. When junction 54, and thus pin $\overline{IRQ}$, is a few volts above zero and increasing, microcomputer M1 executes an interrupt and stores a value of time indicative of when the interrupt occurred.

As the motor begins to rotate, the voltage across start winding 16 begins to increase. As the voltage across start winding 16 increases, the voltage at junction 46 between resistors R2 and R3 increases due to current flow through resistors R2 and R3. Rectifier CR2 prevents a reversal of current flow through resistors R2 and R3. The voltage at junction 46 is applied through lead 48 to pin PB0. Rectifier CR3 clamps pin PB0 at a voltage slightly below the voltage at $V_{SS}$ so as to prevent an excessive voltage value from being applied to pin PB0. When junction 46, and thus pin PB0, is a few volts above zero and increasing, microcomputer M1 stores a value of time indicative of when this condition occurred.

Resistors R2 and R4 are preferably 10K ohms and resistors R3 and R5 are preferably 720K ohms. With such voltage divider values, the times at which the voltages across windings 14 and 16 reach the "few volts above zero" voltage levels are very close to the repetitive times at which the voltages are zero and increasing.

Microcomputer M1 is programmed to monitor junctions 46 and 54 in the manner previously described and preferably every line-cycle, and to determine the difference in time between the times at which the main winding voltage and the start winding voltage reach the "few volts above zero" voltage level. Such time difference defines a phase angle relationship between the two windings 14 and 16. Microcomputer M1 is further programmed to compare the time difference value relating to the instant one of such monitoring events with the time difference value relating to the monitoring event immediately prior to the instant monitoring event so as to determine whether the time difference (phase angle) is increasing or decreasing. As will hereinafter be described, the present invention utilizes changes in such time difference (phase angle) for determining when to disconnect start capacitor C2.

Figure 2:
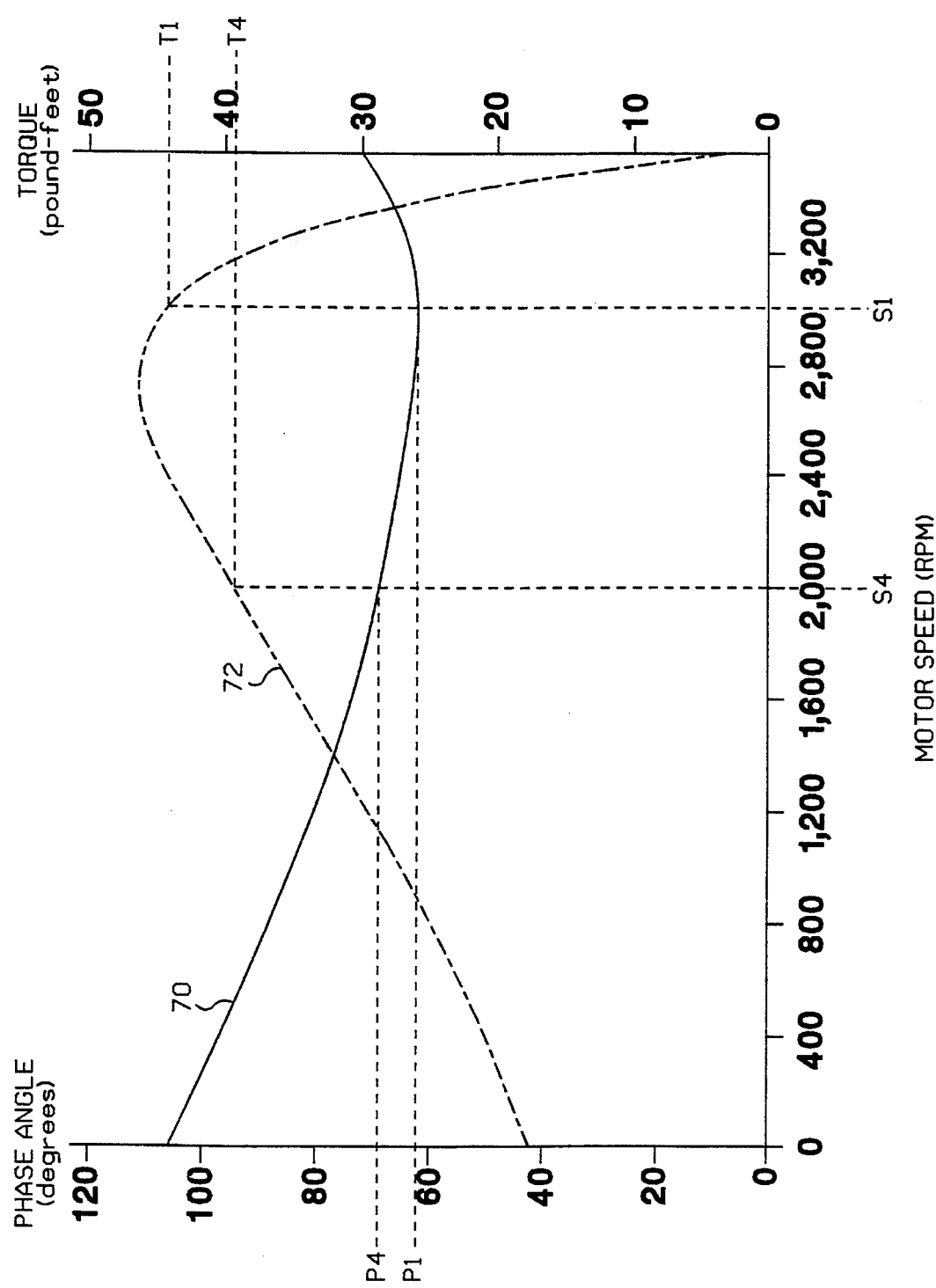
FIG. 2 is a graph illustrating phase angle and torque with respect to motor speed in a capacitor-start, capacitor-run motor with the start capacitor connected.

Referring to FIG. 2, a curve 70 illustrates the manner in which a phase angle between windings 14 and 16 changes with respect to motor speed in a particular motor tested, such motor being a 5-horsepower motor of the capacitor-start, capacitor-run type. As shown, the phase angle is approximately 105 degrees when the motor speed is zero. As the motor speed increases, the phase angle decreases. At a speed S1 of approximately 3000 RPM, when the phase angle is approximately 62 degrees, the phase angle stops decreasing and begins to increase. Microcomputer M1 responds to this increase in phase angle by disconnecting start capacitor C2. Specifically, microcomputer M1 monitors the phase relationship of main winding 14 and start winding 16 at its pins $\overline{IRQ}$ and PB0, respectively, in the manner previously described. When the phase angle stops decreasing and begins to increase, microcomputer M1 provides a logic low at pin PA4. The logic low enables triac Q1 to be gated on through resistor R7. With triac Q1 conducting, relay coil 18 is energized whereby its controlled contacts 20 open thereby disconnecting start capacitor C2 from start winding 16.

As previously described, it is desirable that a start capacitor be disconnected at approximately 80 percent of synchronous speed, which disconnecting speed would be 2880 RPM with a motor whose synchronous speed is 3600 RPM. While 3000 RPM is approximately 83 percent of the synchronous speed, it is sufficiently near the desired disconnecting speed.

While normal fluctuations in applied line voltage cause the value of the voltage across start winding 16 to fluctuate, such fluctuations do not appreciably affect the phase angle motor speed relationship illustrated in FIG. 2. Specifically, while curve 70 represents the phase relationship at a specific value of applied line voltage, the illustrated phase relationship remains essentially the same with any applied line voltage within the allowable limits of such fluctuations, such limits being, for example, plus 10 percent and minus 15 percent of 230 volts.

Curve 72 in FIG. 2 illustrates the torque developed in the tested motor with respect to motor speed. It is noted that the maximum torque occurs at a speed slightly less than speed S1. At speed S1, the torque is just a few pound-feet less than its maximum value. Thus, the torque being developed when the start capacitor C2 is disconnected is very near its maximum value. That the torque is at or near its maximum value when the start capacitor C2 is disconnected ensures that the motor will not stall but rather will continue to run properly.

Figure 3:
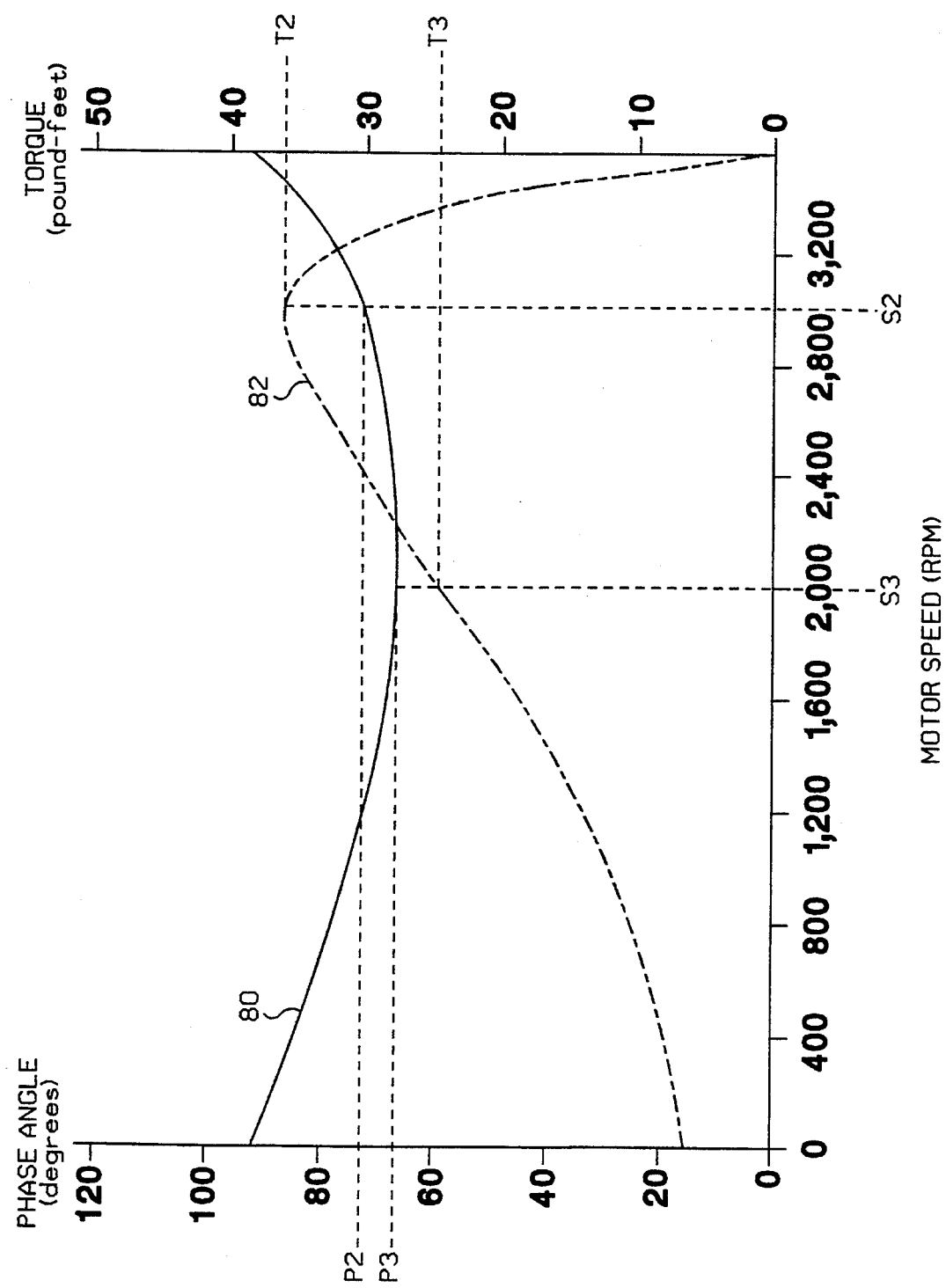
FIG. 3 is a graph similar to FIG. 2 illustrating the phase angle and torque with respect to motor speed with the start capacitor disconnected.

When start capacitor C2 is disconnected, the values of the torque and phase angle change. Referring to FIG. 3, curves 80 and 82 therein illustrate the phase angle and torque versus motor speed relationships, respectively, of the tested motor with start capacitor C2 disconnected. Motor speed S2 is the same speed as the 3000 RPM speed S1 of FIG. 2. When start capacitor C2 is disconnected, the torque decreases from approximately 44 pound-feet indicated at T1 in FIG. 2 to approximately 36 pound-feet indicated at T2 in FIG. 3; the phase angle increases from approximately 62 degrees indicated at P1 in FIG. 2 to approximately 73 degrees indicated at P2 in FIG. 3.

Typically, the motor has started properly so that the small drop in torque when start capacitor C2 is disconnected does not cause the motor to stall due to the load requirements exceeding the available torque. The motor increases its speed past speed S2 to a speed at which the torque produced by the motor equals the torque required by the load, such speed being slightly less than synchronous speed and sometimes being referred to as the slip speed.

As previously described, relay coil 18 is initially energized in response to a reversal from a decreasing to an increasing phase angle. Also as previously described, the phase angle increases abruptly when start capacitor C2 is disconnected at speed S2. Also, as shown in FIG. 3, the phase angle continues to increase as the motor increases its speed past speed S2. Such increases in phase angle enable continued energizing of relay coil 18 and thus enable continued disconnection of start capacitor C2.

For the purpose of preventing start capacitor C2 from being damaged, microcomputer M1 includes an internal timer which provides a specific time period, such as 5 seconds, for limiting the amount of time that start capacitor C2 can be energized. If start capacitor C2 is not disconnected within 5 seconds of the motor 12 being energized, microcomputer M1 provides a logic low at pin PA4 to enable triac Q1 to be gated on, thus enabling relay coil 18 to be energized and thus causing start capacitor C2 to be disconnected.

Preferably, microcomputer M1 is programmed to provide for reconnection of start capacitor C2, and thereby provide an increase in torque, in the event that the motor begins to stall. It should be noted that this feature of providing for reconnection of start capacitor C2 can be omitted if it is not desired. The basic logic utilized in microcomputer M1 is to monitor the phase angle as previously described and to de-energize relay coil 18 when the phase angle reverses. Accordingly, referring to curve 80 in FIG. 3, as the motor speed decreases, the phase angle decreases. At a motor speed S3 of approximately 2000 RPM, the phase angle begins to increase. The phase angle at speed S3 is indicated as phase angle P3. Referring to curve 82 in FIG. 3, the torque at motor speed S3 is indicated as torque T3. At speed S3, when the phase angle reverses, triac Q1 turns off, thus effecting de-energizing of relay coil 18. With coil 18 de-energized, its contacts 20 close thereby reconnecting start capacitor C2.

When start capacitor C2 is reconnected, the values of the torque and phase angle change. Referring to FIG. 2, motor speed S4 is the same speed as speed S3 in FIG. 3. When start capacitor C2 is reconnected, the torque increases from approximately 24 pound-feet indicated at T3 in FIG. 3 to approximately 39 pound-feet indicated at T4 in FIG. 2; the phase angle increases from approximately 66 degrees indicated at P3 in FIG. 3 to approximately 70 degrees indicated at P4 in FIG. 2. If the increased torque is sufficient to satisfy the load requirements, the motor speed will then increase; if not sufficient, the motor will stall.

While a preferred embodiment of the present invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

I claim:

1. In a starting device for a single phase induction motor having a main winding, a start winding and a start capacitor, comprising:

means for monitoring voltage across the main winding;

means for monitoring voltage across the start winding;

means responsive to both said monitoring means for determining phase relationship between said voltages across said main winding and said start winding; and means responsive to a specific condition of said phase relationship for effecting disconnection of the start capacitor from said start winding, said specific condition of said phase relationship being a condition wherein a phase angle defined by said phase relationship reverses from a decreasing value to an increasing value in response to changes in motor speed.

2. The starting device claimed in claim 1 wherein said specific condition of said phase relationship occurs at a motor speed of approximately 80 percent of synchronous speed.

3. The starting device claimed in claim 1 wherein said specific condition of said phase relationship occurs at a motor speed which is at or near a specific speed at which the motor develops its maximum torque.

4. In a starting device for a single phase induction motor having a main winding, a start winding and a start capacitor, comprising:

means for monitoring voltage across the main winding;

means for monitoring voltage across the start winding;

means responsive to both said monitoring means for determining phase relationship between said voltages across said main winding and said start winding;

a relay having a coil and normally-closed contacts, said relay contacts connecting said start capacitor and said start winding in series across an alternating current power source; and means responsive to a specific condition of said phase relationship for effecting opening of said relay contacts whereby said start capacitor is disconnected from said start winding, said specific condition of said phase relationship being a condition wherein a phase angle defined by said phase relationship reverses from a decreasing value to an increasing value in response to changes in motor speed.

5. The starting device claimed in claim 4 wherein said means responsive to a specific condition of said phase relationship for effecting opening of said relay contacts includes a microcomputer and a triac, said triac having a gate terminal connected to said microcomputer so that said microcomputer controls conduction of said triac and having main terminals connected in series with said relay coil.

6. In a starting device for a single phase induction motor having a main winding, a start winding and a start capacitor, comprising:

means for monitoring voltage across the main winding;

means for monitoring voltage across the start winding;

means responsive to both said monitoring means for determining phase relationship between said voltages across said main winding and said start winding;

means responsive to a first specific condition of said phase relationship for effecting disconnection of the start capacitor from said start winding; and means responsive to a second specific condition of said phase relationship for effecting reconnection of said start capacitor to said start winding, each of said specific conditions being a condition wherein a phase angle defined by said phase relationship reverses from decreasing in value to increasing in value in response to changes in motor speed, said first specific condition occurring at a first value of motor speed as motor speed increases, said second specific condition occurring at a second value of motor speed as motor speed decreases, said first value of motor speed being higher than said second value of motor speed.

7. The starting device claimed in claim 6 wherein said first value of motor speed is approximately 80 percent of synchronous speed.

8. The starting device claimed in claim 6 wherein said first value of motor speed is at or near a specific speed at which the motor develops its maximum torque.

\* \* \* \* \*